United States Patent [19]

Tadokoro et al.

[11] Patent Number: 5,506,074
[45] Date of Patent: Apr. 9, 1996

[54] METAL HYDRIDE ELECTRODE AND NICKEL-HYDROGEN ALKALINE STORAGE CELL

[75] Inventors: Motoo Tadokoro; Fusago Mizutaki; Nobuyasu Ishimaru, all of Tokushima, Japan

[73] Assignee: Sanyo Electric Co. Ltd., Osaka, Japan

[21] Appl. No.: 314,371

[22] Filed: Sep. 28, 1994

[30] Foreign Application Priority Data

Sep. 30, 1993 [JP] Japan .................... 5-245229

[51] Int. Cl.$^6$ .......................... H01M 4/48; H01M 4/62
[52] U.S. Cl. .......................... 429/218; 429/212; 429/223; 420/900
[58] Field of Search ........................ 429/223, 212, 429/218, 59; 420/900

[56] References Cited

U.S. PATENT DOCUMENTS

| | | | |
|---|---|---|---|
| 4,696,873 | 9/1987 | Yagasaki et al. | 429/218 |
| 4,810,600 | 3/1989 | Périard et al. | 429/212 |
| 5,043,233 | 8/1991 | Kameoka et al. | 429/59 |
| 5,053,292 | 10/1991 | Hasbe et al. | 429/101 |

FOREIGN PATENT DOCUMENTS

| | | |
|---|---|---|
| 61-66366 | 4/1986 | Japan . |
| 62-295353 | 12/1987 | Japan . |
| 63-55857 | 3/1988 | Japan . |
| 3-274664 | 12/1991 | Japan . |
| 5-412210 | 2/1993 | Japan . |

OTHER PUBLICATIONS

Murata, *Patent Abstracts of Japan* vol. 17, No. 334 (E-1387) [5963], p. , Jun. 24, 1993.

*Primary Examiner*—Prince Willis, Jr.
*Assistant Examiner*—Carol Chaney
*Attorney, Agent, or Firm*—Armstrong, Westerman, Hattori, McLeland & Naughton

[57] ABSTRACT

A metal hydride electrode is mainly composed of a hydrogen-absorbing alloy and provided with carbon powder which is selected from acetylene black, carbon black, ketjen black, and active carbon. The metal hydride electrode is further provided with an additive including an oxide and/or a hydroxide of a metal having oxidation-reduction potential nobler than an operational potential of the hydrogen-absorbing alloy. The metal hydride electrode has excellent oxygen gas absorption ability and easy detection of $-\Delta V$, thereby realizing to produce a nickel-hydrogen alkaline storage cell with excellent charge/discharge cycle life.

12 Claims, 6 Drawing Sheets

METAL HYDRIDE ELECTRODE AND NICKEL-HYDROGEN ALKALINE STORAGE CELL

BACKGROUND OF THE INVENTION (1) Field of the Invention

The present invention relates to a metal hydride electrode mainly composed of a hydrogen-absorbing alloy, and particularly to such a metal hydride electrode to be provided for a sealed-type nickel-hydrogen alkaline storage cell.

(2) Description of the Related Art

Nickel-hydrogen alkaline storage cells have been attracting attention because of their advantages of being lighter in weight, larger in capacity, and higher in energy density than conventional nickel-cadmium storage cells and lead storage cells.

Such a sealed-type nickel-hydrogen alkaline storage cell is generally produced as follows.

First, the metal hydride electrode of the sealed-type nickel-hydrogen alkaline storage cell is produced as described in Japanese Laid-Open Patent Application No. 61-66366 as follows. Hydrogen-absorbing alloy powder is kneaded with a binder such as polytetrafluoroethylene (hereinafter PTFE) or polyethylene oxide into a paste, applied onto both surfaces of a support made of a punching metal or an expanded metal, and dried.

The metal hydride electrode thus produced is coiled together with a sintered nickel positive electrode via a separator, and put into an outer can. The outer can is sealed after an alkaline electrolyte is poured thereinto.

The sealed-type nickel-hydrogen alkaline storage cell thus produced is designed to have a negative electrode with larger capacity than a positive electrode in order to prevent the generation of hydrogen gas from the negative electrode in the final period of a charging operation. Consequently, the positive electrode falls into an overcharged state during a charging operation earlier than the negative electrode. In the overcharged state, oxygen gas is generated from the positive electrode through the following reaction.

$$4OH^- \rightarrow 2H_2O + O_2 + 4\ e^- \qquad (1)$$

However, the oxygen gas generated from the positive electrode moves to the negative electrode through the separator, and reacts with hydrogen on the surface of the negative electrode composed of hydrogen-absorbing alloy which is being charged. As a result, water is generated. The reaction is shown in the following reaction formula (2).

$$4MH + O_2 \rightarrow 4M + 2H_2O \qquad (2)$$

The oxygen gas generated from the positive electrode is thus consumed in the negative electrode, so that there is no raise in the cell internal pressure in the case of a sealed type cell.

However, if the reaction of the formula (2) is not smoothly performed due to the insufficient oxygen gas consumption of the negative electrode, the oxygen gas which is generated from the positive electrode and remains unconsumed is accumulated within the cell, thereby raising the cell internal pressure. The raise in the cell internal pressure causes the electrolyte to leak out of the cell together with the emission of the oxygen gas through a safety vent.

On the other hand, even if a storage cell is provided with a negative electrode having fairly high ability of absorbing oxygen gas, when the storage cell is charged at a high rate until being overcharged, a great amount of oxygen gas is generated from the positive electrode. As a result, the negative electrode cannot afford to absorb all the oxygen gas generated, and the oxygen gas begins to oxidize the hydrogen-absorbing alloy itself. The oxidization of the alloy leads to the deterioration of its hydrogen absorbing/desorbing ability. In short, the generation of too much oxygen gas leads to the decrease in the charge/discharge cycle life of the cell.

In order to avoid this problem, the following methods are used to lessen the oxygen gas to be generated from the positive electrode and to accelerate oxygen gas consumption at the negative electrode.

1) A method for controlling charged amount properly

When a nickel-hydrogen alkaline storage cell is charged, the cell voltage gradually increases until it reaches its peak which comes immediately before the full-charged state. If a charging operation is continued even after the peak, the cell is set in an overcharged state. During the time period from the full-charged state to the overcharged state, the cell voltage drops. The dropping of the voltage ($-\Delta V$) is detected, and upon detecting the $-\Delta V$, a charging operation is suspended to prevent the cell from falling into the overcharged state.

Thus, these kinds of cells are charged with the use of a charger capable of storing the peak voltage value at the final period of the charging operation and of suspending the charging operation at the point where a certain amount of voltage $-\Delta V$ has dropped.

In the case of nickel-hydrogen alkaline storage cells, however, the amount of change in the cell voltage between the full-charged state and an overcharged state is too small to be detected accurately and speedy. This problem brings about a time lag between the full-charged state and the overcharged state, and overcharge is progressed during the time lag. As a result, a great amount of oxygen gas is generated from the positive electrode.

2) A method for reinforcing oxygen gas consumption ability of the negative electrode by adding a metal thereto This method has been proposed in Japanese Laid-Open Patent Applications Nos. 2-239566, 5-41210, and 3-274664.

The application No. 2-239566 discloses adding a metallic oxide such as CuO to the inside of the negative electrode made of hydrogen-absorbing alloy. The application No. 5-41210 discloses adding at least one of a metallic oxide, a metallic hydroxide, and a metallic salt each of which can be either copper, bismuth, lead, silver, or thallium. According to the technique, a metal added to the negative electrode accelerates the oxygen gas consumption reaction of the negative electrode and increases the amount of voltage $-\Delta V$ to some extent. Consequently, the charge/discharge cycle life of the cell can be improved.

However, these metals to be added to the negative electrode do not have the ability of absorbing/desorbing hydrogen, so that the energy density of the negative electrode is decreased in accordance with the amount of the added metal. As a result, it is necessary to prevent the decrease in the energy density by minimizing the amount of metal to be added to the negative electrode. The prevention requires to make the best use of the effects of accelerating the oxygen gas absorption of the metal. According to these applications, however, the effects of accelerating the oxygen gas absorption of the metal are not fully obtained.

On the other hand, the application No. 3-274664 discloses a technique of providing a layer made of metallic powder and carbon powder on the surface of the negative electrode made of hydrogen-absorbing alloy, in order to improve the ability of consuming oxygen gas.

However, this technique also fails to fully obtain an effect of accelerating oxygen gas absorption of a metal and another effect of increasing the voltage drop after the full-charged state.

SUMMARY OF THE INVENTION

In view of the foregoing problems, a first object of the present invention is to provide a metal hydride electrode having high oxygen gas consumption ability and a large voltage drop after a full-charged state, thereby improving the cycle life of a nickel-hydrogen alkaline storage cell.

The first object can be achieved by a metal hydride electrode containing a hydrogen-absorbing alloy. At least a surface of the metal hydride electrode includes conductive powder and an additive which includes an oxide and/or a hydroxide of a metal having oxidation-reduction potential nobler than an operational potential of the hydrogen-absorbing alloy.

The conductive powder may be carbon powder. The carbon powder may be at least one of acetylene black, carbon black, ketjen black, and active carbon.

The additive may be at least one of cuprous oxide, cupric oxide, copper hydroxide, silver (I) oxide, silver (II) oxide, and bismuth oxide.

The additive may be in a range of between 0.5 wt % and 5.4 wt % inclusive to the hydrogen-absorbing alloy.

The first object can be achieved by the following effects of the conductive powder and the additive.

The conductive powder works to increase the reacting surface of the additive made of a metal oxide and/or a metal hydroxide. The conductive powder further works as a crystal nucleation sites which induces the precipitation of a metallic crystal and also works to make it better the conductivity among the particles of the additive or with the hydrogen-absorbing alloy. In addition, the additive works to enlarge the difference in a cell charge voltage between the full-charged state and the overcharged state. These functions of the conductive powder are explained as follows.

1) The additive made of metallic oxide and/or metallic hydroxide which is applied on the surface of the electrode dissolves in the alkaline electrolyte more easily than when it is in the form of the metallic element. Therefore, the additive dissolves quickly in the form of metallic ions in the alkaline electrolyte. The metallic ions dissolved in the alkaline electrolyte reprecipitate on the surface of the electrode when the cell is charged. Since the conductive powder such as carbon powder is dispersed on the surface of the electrode, the conductive powder enlarges the surface of the electrode and also works as a crystal nucleation sites of the metallic crystal. Consequently, the metallic ions in the electrolyte can smoothly precipitate all over the surface of the electrode around the crystal nucleation sites. The metallic crystal particles uniformly precipitated on the surface of the electrode are small in size and have large specific surface area, so that the area concerned with the reaction with oxygen gas is large. Consequently, the oxygen gas generated from the positive electrode is effectively combined with the metal, thereby accelerating the oxygen gas consuming reaction of the negative electrode (hydrogen-absorbing alloy).

The acceleration of the oxygen gas consuming reaction seems to result from the reactions of the metal which has been reduced and precipitated on the surface of the negative electrode with oxygen, and also with hydrogen on the surface of the hydrogen-absorbing alloy electrode. It seems that the metal helps the reaction between the oxygen gas and hydrogen on the surface of the hydrogen-absorbing alloy, by temporarily holding the oxygen gas by means of the attraction or combination.

2) The additive made of metal oxide or metal hydroxide having oxidation-reduction potential nobler than the operational potential of the hydrogen-absorbing alloy can enlarge $-\Delta V$ in accordance with the principle of 3) below. A cell having large $-\Delta V$ can perform a charging operation properly based on $-\Delta V$ detection control system. As a result, overcharging can be prevented, and the decrease in a cycle life resulted from generation of too much oxygen gas can be prevented.

3) The mechanism that the additive can increase $-\Delta V$ is explained as follows.

First of all, the potential of each reaction concerned with the nickel-hydrogen alkaline storage cell provided with the metal hydride electrode is explained as follows.

FIG. 1 shows the potential of each reaction to be carried out in the nickel-hydrogen alkaline storage cell provided with the metal hydride electrode of the present invention. In FIG. 1, the reaction formulas (1)–(3) respectively show a reaction in the positive electrode, a reaction with a hydrogen-absorbing alloy in the negative electrode (metal hydride electrode), and oxygen generation. The reaction formulas (4)–(6) show the oxidizing reaction of metals (silver, copper, bismuth) provided on the surface of the negative electrode. The figures left to the formulas indicate the standard electrode potential of each reaction at 25° C.

The upper reactions appear, the higher reaction potential (the nobler). The theoretical cell voltage of the nickel-hydrogen alkaline storage cell during a normal charging operation is a value obtained by subtracting the potential ($-0.828$ V) of the reaction formula (2) in the negative electrode from the potential ($+0.52$ V) of the reaction formula (1) in the positive electrode. However, the value cannot be actually obtained because overvoltage is impressed due to charge/discharge operation.

The following is an explanation why $-\Delta V$ is caused when the nickel-hydrogen alkaline storage cell is overcharged, and why the metal hydride electrode of the present invention has a large $-\Delta V$.

The reaction to consume oxygen gas in the negative electrode is an exothermic reaction. Therefore even in the case of a conventional electrode having no additive made of a metallic compound, the temperature of the cell rises through the oxygen gas consuming reaction. And the potential of the reaction formula (1) in the positive electrode is shifted in the direction of the base (minus). In addition, in the case of the metal hydride electrode of the present invention, nobler potential metals than the metal hydride electrode such as silver, copper, and bismuth or their oxide or hydroxide exist on the surface of the negative electrode. Consequently, the reactions shown in the formulas (4)–(6) are caused in the negative electrode. The potentials of the reactions of the formulas (4)–(6) are nobler than those of the reaction formula (2), so that the potential of the negative electrode is shifted in the direction of the noble (plus) through the reaction of the formulas (4)–(6). The more reactions of the formulas (4)–(6) are carried out, the potential of the negative electrode is more shifted to the noble (plus). The formulas (4)–(6) are exothermic reactions, so that the cell temperature is raised through these reactions, shifting the potential of the reaction formula (1) further to the base (minus). In other words, the metallic compound to be added works to further reduce the potential difference between the positive electrode and the negative electrode during an overcharge operation. In addition, the conductive powder applied on the surface of the electrode makes it better the conductivity between the metals or with negative electrode support, thereby accelerating the reactions of the formulas (4)–(6). Thus, as a result of the reaction of each element, the potential difference between the positive electrode and the negative electrode can be effectively reduced, thereby enlarging $-\Delta V$.

The following is a description on the components of the present invention. It is preferable to use, as conductive powder, conductive fine particles such as carbon powder. Among carbon powder, acetylene black, carbon black, ketjen black, and active carbon are most preferable. These carbon powders with conductive fine particles work as a crystal nucleation sites when metallic ions dissolved in the alkaline electrolyte are precipitated, and have preferable features to precipitate metallic crystals having large specific surface areas.

It is preferable to use, as an additive made of the metallic oxide and/or metallic hydroxide, at least one of cuprous oxide, cupric oxide, copper hydroxide, silver (I) oxide, silver (II) oxide, and bismuth oxide. The reason for this is that these metals have preferable reaction potential for enlarging $-\Delta V$, and their oxide or hydroxide are more easily dissolved in the alkaline electrolyte than the metallic elements themselves, and precipitates more on the conductive powder.

In addition, the preferable range of the additive to be added is between 0.5 and 5.4 wt % to the hydrogen-absorbing alloy. The most preferable range is 0.8 and 5.0 wt %, which can assure the sufficient charge/discharge cycle life.

As described hereinbefore, the present invention can provide a metal hydride electrode with excellent performance to absorb oxygen gas which generates during an overcharge operation and with large $-\Delta V$. Consequently, a nickel-hydrogen alkaline storage cell having such an electrode as the negative electrode is freed from leaking of the electrolyte caused by the raise in the cell internal pressure because oxygen gas generated in the positive electrode is smoothly absorbed in the negative electrode. In addition, a charging operation is properly carried out, so that there is no possibility of the generation of too much oxygen gas from the positive electrode due to overcharging. Hence, nickel-hydrogen alkaline storage cell with excellent charge/discharge cycle life can be obtained.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

EMBODIMENT 1

Figure 1:
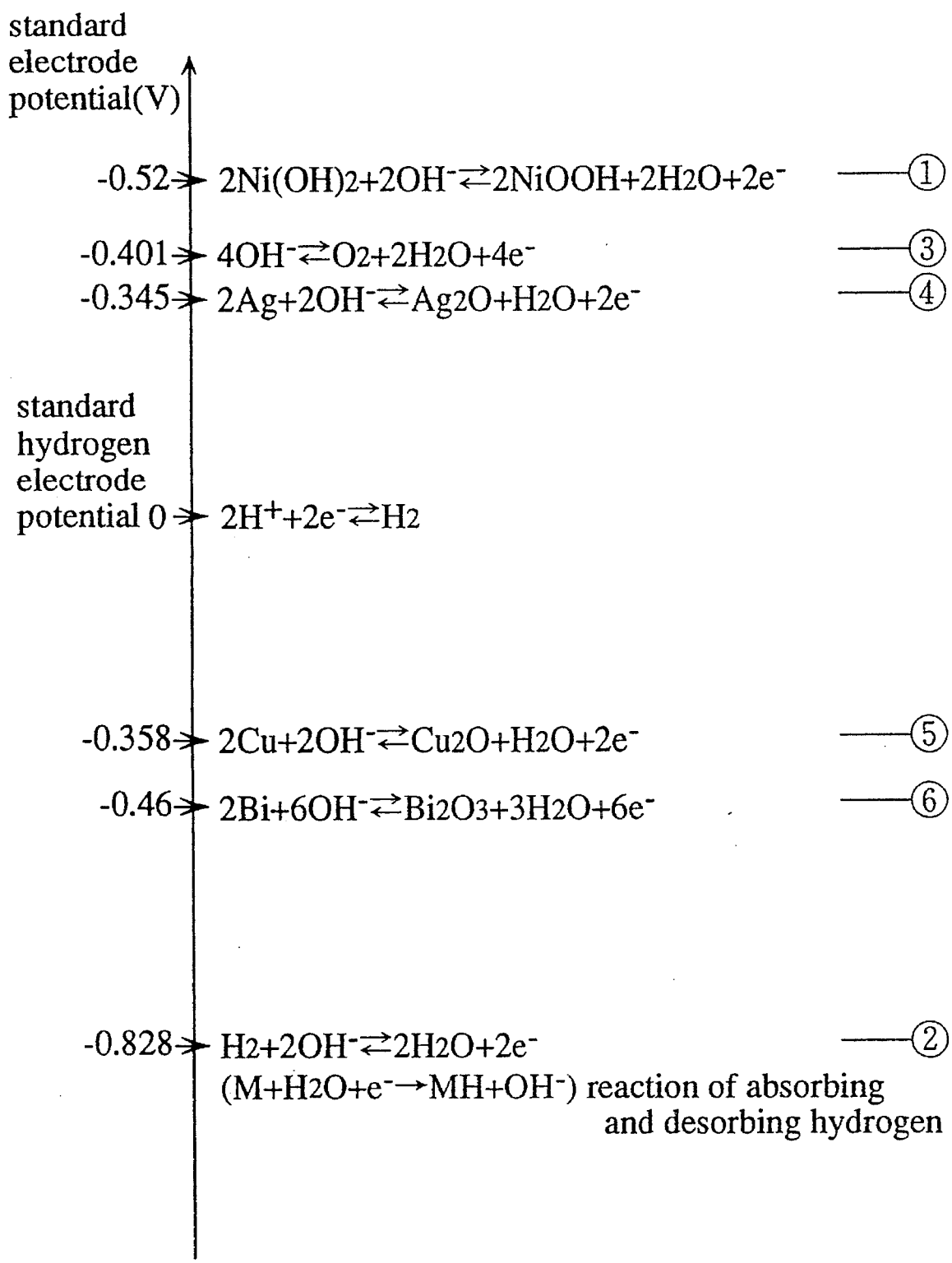
FIG. 1 shows the potential of each reaction to be carried out in the nickel-hydrogen alkaline storage cell provided with the metal hydride electrode of the present invention.

A hydrogen-absorbing alloy electrode on whose surface acetylene black and cuprous oxide are applied is produced as follows, and a cylindrical sealed nickel-hydrogen alkaline storage cell provided with the hydrogen-absorbing alloy electrode is produced as follows.
(Production of a metal hydride electrode)

First, commercially available Mm (misch metal, a mixture of rare-earth elements), Ni, Co, Al, and Mn in an elemental ratio of 1.0:3.4:0.8:0.2:0.6 were melted in a high frequency induction vacuum melting furnace at an argon atmosphere.

The resulting melt was cooled to produce an ingot of hydrogen-absorbing alloy expressed by $Mm_{1.0}Ni_{3.4}Co_{0.8}Al_{0.2}Mn_{0.6}$. The ingot was pulverized to produce hydrogen-absorbing alloy powder whose particles had diameters of 150 μm or below at an inert gas.

Then, the alloy powder was kneaded with 5 wt % of PTFE powder to the alloy powder into a paste. The paste was applied onto both surfaces of the collector made of punching metal, dried, and pressed to form an electrode base.

In addition, a slurry was prepared by mixing 3 wt % of acetylene black, 7.5 wt % of cuprous oxide powder to the entire weight of the slurry, and a 3% polyvinyl alcohol aqueous solution. The slurry was applied onto the surface of the electrode base several times through a screen printing so as to contain 1 wt % of acetylene black and 2.5 wt % of cuprous oxide powder to the hydrogen-absorbing alloy. The slurry was then dried and pressed repeatedly. Finally, a metal hydride electrode provided with acetylene black and cuprous oxide on its surface is produced. The metal hydride electrode thus produced is hereinafter referred to as the electrode a.
(Production of a storage cell)

The electrode a of the present invention is coiled together with a well-known sintered-type nickel positive electrode via a separator made of nonwoven cloth to form an electrode assembly. The assembly was disposed in an outer can into which a KOH aqueous solution of 30 wt % was poured. The outer can was sealed to finally produce a cylindrical sealed nickel-hydrogen alkaline storage cell having a theoretical capacity of 1000 mAh.

The storage cell thus provided with the electrode a is hereinafter referred to the cell A.

EMBODIMENTS 2–6

Metal hydride electrodes b, c, d, e, and f were produced by using acetylene black as carbon powder and, as an additive, cupric oxide, copper hydroxide, silver (I) oxide, silver (II) oxide, and bismuth oxide respectively in the second, third, fourth, fifth, and sixth embodiments. Furthermore, sealed-type nickel-hydrogen alkaline storage cells B, C, D, E, and F were produced by using these electrodes b through f respectively. These electrodes and storage cells were produced in the same manner as the first embodiment except that different metallic compounds (additives) from that of the cell A were applied onto the surfaces of these electrodes.

EMBODIMENTS 7-9

Metal hydride electrodes g, h, and i were produced by using cuprous oxide as an additive and, as carbon powder, active carbon (g), carbon black (h), and ketjen black (i). Furthermore, sealed-type nickel-hydrogen alkaline storage cells G, H, and I were produced by providing these electrodes g-i. These cells were the same as the cell A of the first embodiment except for the type of the carbon powder applied onto the surfaces of the electrodes.

COMPARATIVE EXAMPLE 1

A metal hydride electrode k provided with no carbon powder and no metal additive both on the surface of and inside the electrode was produced. Furthermore, a nickel-hydrogen alkaline storage cell K provided with the metal hydride electrode k as the negative electrode was produced. The electrode was produced in the same manner as in the first embodiment.

The electrode k is the same as the base electrode in the first embodiment, including neither carbon powder nor a metal.

COMPARATIVE EXAMPLE 2

A metal hydride electrode 1 was produced by providing 1 wt % of acetylene black only to the hydrogen-absorbing alloy to the surface of the base electrode produced in the first embodiment.

Furthermore, a nickel-hydrogen alkaline storage cell L provided with the metal hydride electrode 1 as the negative electrode was produced in the same manner as in the first embodiment.

COMPARATIVE EXAMPLE 3

A metal hydride electrode m was produced by providing 1 wt % of acetylene black and 2.5 wt % of metal copper to a hydrogen-absorbing alloy on the surface of the base electrode produced in the first embodiment.

Furthermore, a nickel-hydrogen alkaline storage cell M provided with the metal hydride electrode m as the negative electrode was produced in the same manner as in the first embodiment.

COMPARATIVE EXAMPLE 4

A metal hydride electrode n was produced by providing cuprous oxide inside the electrode. Furthermore, a storage cell N provided with the metal hydride electrode n as the negative electrode was produced.

The features in producing the electrode n (difference from the first embodiment) is as follows. Hydrogen-absorbing alloy powder, 2.5 wt % of cuprous oxide powder, and 5 wt % of PTFE powder were kneaded with water into paste. The paste was applied onto both surfaces of the collector made of a punching metal, thereby providing cuprous oxide inside the electrode.

The electrode n is the same as the electrode k of the comparative example 1 except that the electrode n includes cuprous oxide.

COMPARATIVE EXAMPLE 5

A metal hydride electrode o was produced by providing cuprous oxide (additive) on its surface. A nickel-hydrogen alkaline storage cell O provided with the metal hydride electrode o as the negative electrode was produced. The electrode o is the same as the electrode a of the first embodiment except that acetylene black (carbon powder) was not provided on the surface of the electrode o. In other words, 2.5 wt % of cuprous oxide only is provided on the base electrode by adding polyvinyl alcohol (PVA) as a binder.

COMPARATIVE EXAMPLE 6

A metal hydride electrode p was produced by providing 1 wt % of acetylene black and 2.5 wt % of silver to the hydrogen-absorbing alloy on the surface of the base electrode. A nickel-hydrogen alkaline storage cell P provided with the metal hydride electrode p as the negative electrode was produced in the same manner as the first embodiment.

COMPARATIVE EXAMPLE 7

A metal hydride electrode q was produced by providing 1 wt % of acetylene black and 2.5 wt % of bismuth to the hydrogen-absorbing alloy on the surface of the base electrode of the first embodiment. A nickel-hydrogen alkaline storage cell P provided with the metal hydride electrode Q as the negative electrode was produced in the same manner as the first embodiment.

Table 1 is a list including all the storage cells produced hereinabove.

TABLE 1

| cells | conductive powder (carbon powders) | additives | provided portions of the electrode |
|---|---|---|---|
| *A | acetylene black | cuprous oxide | surface |
| *B | acetylene black | cupric oxide | surface |
| *C | acetylene black | copper hydroxide | surface |
| *D | acetylene black | silver(I) oxide | surface |
| *E | acetylene black | silver(II) oxide | surface |
| *F | acetylene black | bismuth oxide | surface |
| *G | active carbon | cuprous oxide | surface |
| *H | carbon black | cuprous oxide | surface |
| *J | ketjen black | cuprous oxide | surface |
| K | — | — | — |
| L | acetylene black | — | surface |
| M | acetylene black | copper | surface |
| N | — | cuprous oxide | inside |
| O | — | cuprous oxide | surface |
| P | acetylene black | silver | surface |
| Q | acetylene black | bismuth | surface | cells with * use the negative electrode of the present invention

Experiment 1

Figure 2:
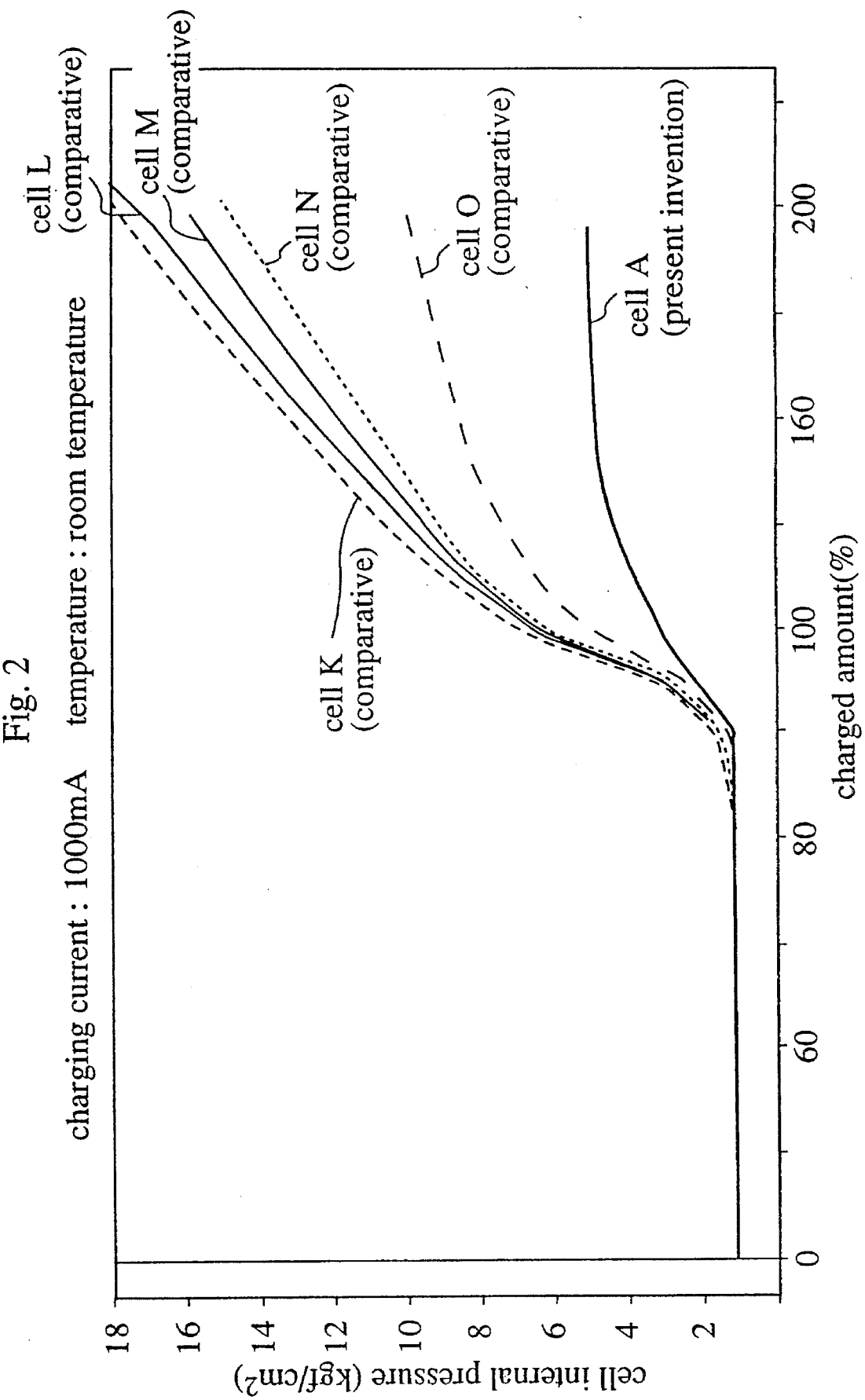
FIG. 2 is a graph showing the relationship between the charged amount and the cell internal pressure.

The cell A of the present invention and the cells K, L, M, N, and O of the comparative examples were charged at 1000 mA to examine the relationship between the charged amount and the cell internal pressure. The results are shown in the graph of FIG. 2. The charged amount (%) in FIG. 2 corresponds to 100% of the cell theoretical capacity (1000 mAh).

As apparent from the graph of FIG. 2, the cell internal pressure during an overcharging operation are ordered from the highest: cell K (no addictive)≧cell L (with acetylene black on the surface of the negative electrode)>cell M (with acetylene black and copper on the surface of the negative electrode)≧cell N (with cuprous oxide inside the negative electrode)>>cell O (with cuprous oxide on the surface of the negative electrode)>>cell A of the present invention (with acetylene black and cuprous oxide on the surface of the negative electrode). This result indicates that the application of only acetylene black on the surface of the negative electrode does not exhibit enough effects to restrict the cell internal pressure. On the other hand, the application of either copper or cuprous oxide can restrict the raise in the cell internal pressure. In this case, it is more effective to add cuprous oxide than copper, and to add it on the surface of the negative electrode than inside thereof.

Furthermore, it is most effective to add both the acetylene black and cuprous oxide on the surface of the negative electrode for the purpose of restricting the cell internal pressure. The reason for this preferable result seems to be as follows.

The copper or cuprous oxide added to the negative electrode has oxidation-reduction potential which is nobler than the operational voltage of the hydrogen-absorbing alloy. Therefore they are dissolved in the alkaline electrolyte during a discharging operation and reprecipitated on the negative electrode surface during a charging operation. In the circulation of dissolution (discharge) and precipitation (charge), oxygen gas is consumed by reacting with hydrogen on the hydrogen-absorbing alloy. In this reaction, (1) when cuprous oxide is applied on the surface of the electrode, its utility becomes high because it is more easily dissolved in the alkaline electrolyte than copper. (2) When a proper amount of acetylene black powder is applied on the surface of the negative electrode, it increases the outer surface of the negative electrode because of its conductivity and being fine particles. In addition, the acetylene black acts as a nucleation site which allows copper ions to precipitate smoothly in the electrolyte during a charging operation. As a result, fine copper crystals are uniformly precipitated on the entire surface of the negative electrode by using copper ions as a crystal nucleation sites. Since the fine copper crystals have large specific surface area, and accordingly large surface to react with oxygen gas, they can effectively react with oxygen gas generated in the cell.

In other words, when acetylene black is applied on the surface of the negative electrode (cell A of the present invention), oxygen gas can be consumed more effectively than when acetylene black is not applied (for example cell o). Consequently, the raise in the cell internal pressure is restricted.

FIG. 2 shows the cases of copper and cuprous oxide only; however, the use of copper, silver, or bismuth leads to the same result because their oxides or hydroxides are dissolved more easily than their metallic elements. In addition, carbon powders such as carbon black, ketjen black, and active carbon have fine particles with conductivity like acetylene black, so that any combination between these metallic oxides and these carbon powders can exhibit excellent results in the same manner as the combination between the acetylene black and cuprous oxide.

Experiment 2

These cells A, K, L, M, N, and O used in the first experiment were charged at 1000 mA at 0° C. to measure a time period after the charging voltage reaches its peak until −ΔV reaches 10 mV.

The results are shown in Table 2. The relationship between the charged amount (% to theoretical capacity) and the cell voltage (V) of the cell A and the cell K is shown in the graph of FIG. 3.

TABLE 2

| cells | detecting time (minutes) of −ΔV (= 10 mV) |
|---|---|
| *A | 5.0 |
| K | 20.0 |
| L | 19.0 |
| M | 17.3 |
| N | 14.2 |
| O | 10.3 | cell with * uses the negative electrode of the present invention

Figure 3:
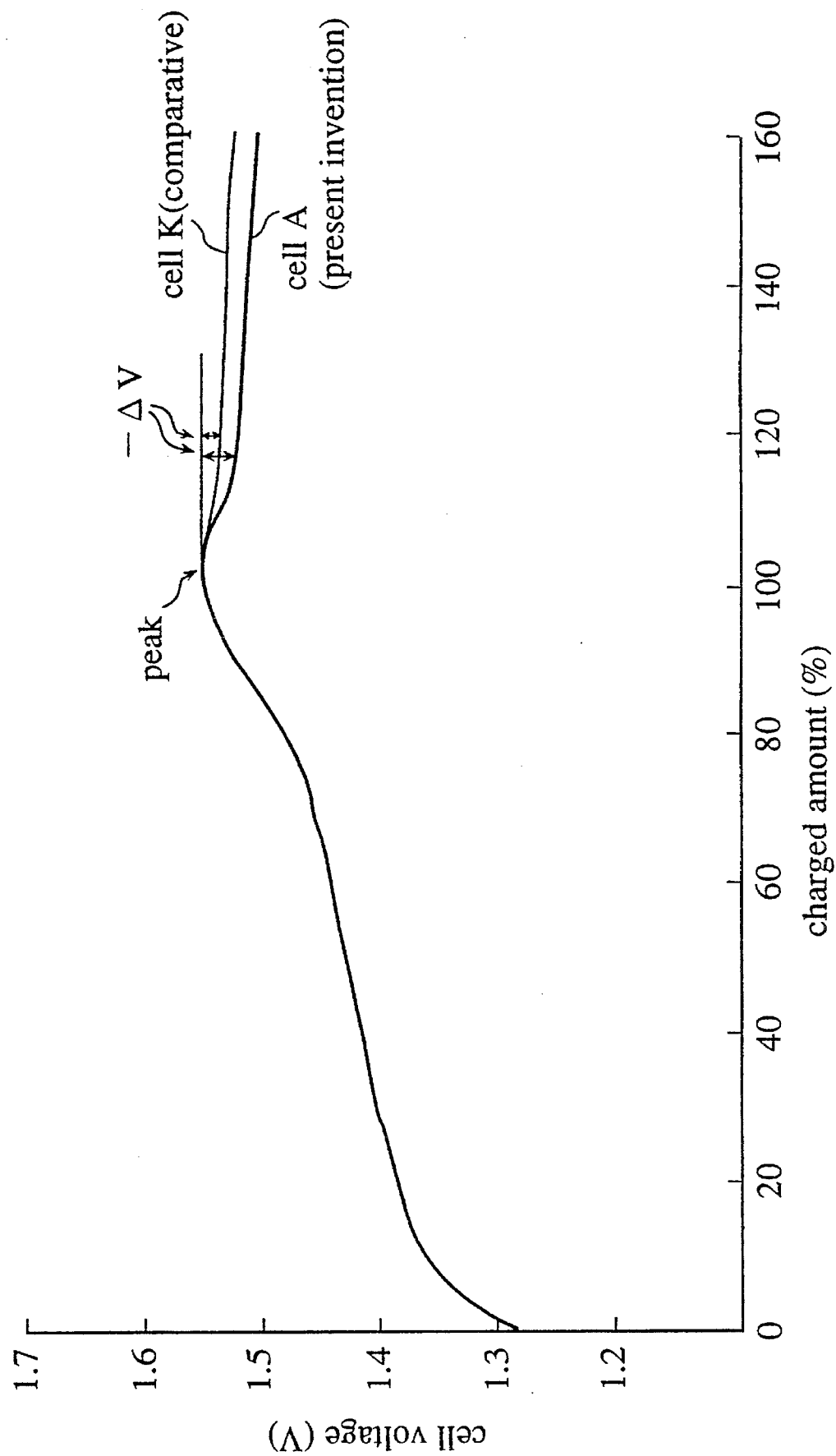
FIG. 3 is a graph showing the relationship between the charged amount (%) and the cell voltage of a sealed-type nickel-hydrogen alkaline storage cell.

The graph of FIG. 3 shows charging voltage characteristics: the cell voltage increases with the progress of a charging operation, reaches its peak immediately before the full-charged state, and drops a little when the cell falls into an overcharged state. The cell A of the present invention has a larger dropping voltage amount (−ΔV) from a full-charged state to an overcharged state than the cell K. The amount of the dropped voltage of each cell is shown in Table 2. The detecting time of −ΔV is ordered from the shortest: cell A< cell O<cell N<cell M<cell L<cell K.

The results indicate that when both acetylene black and cuprous oxide are applied on the surface of the negative electrode (cell A), −ΔV can be greatly increased than when acetylene black only is used (cell L), when cuprous oxide only is used (cells N and O), when acetylene black and copper are used (cell M), or when no additive are applied (cell K).

Experiment 3

These cells A, K, L, M, N, and O used in the first experiment were given charge/discharge cycle test to measure the discharge capacity in every cycle and their weights after a discharging operation in each cycle, thereby examining the relationship between the charge/discharge cycle number and cell capacity, and between the charge/discharge cycle number and the amount of decrease in cell weight. Charging conditions: the cells were charged at 1000 mA with a charger which can suspend a charging operation at the point where −ΔV is 10 mV, and rested for an hour after the charging operation is suspended.
Discharging operation conditions: the cells were discharged at 1000 mA until the voltages become 1 V and rested for an hour.

Figure 4:
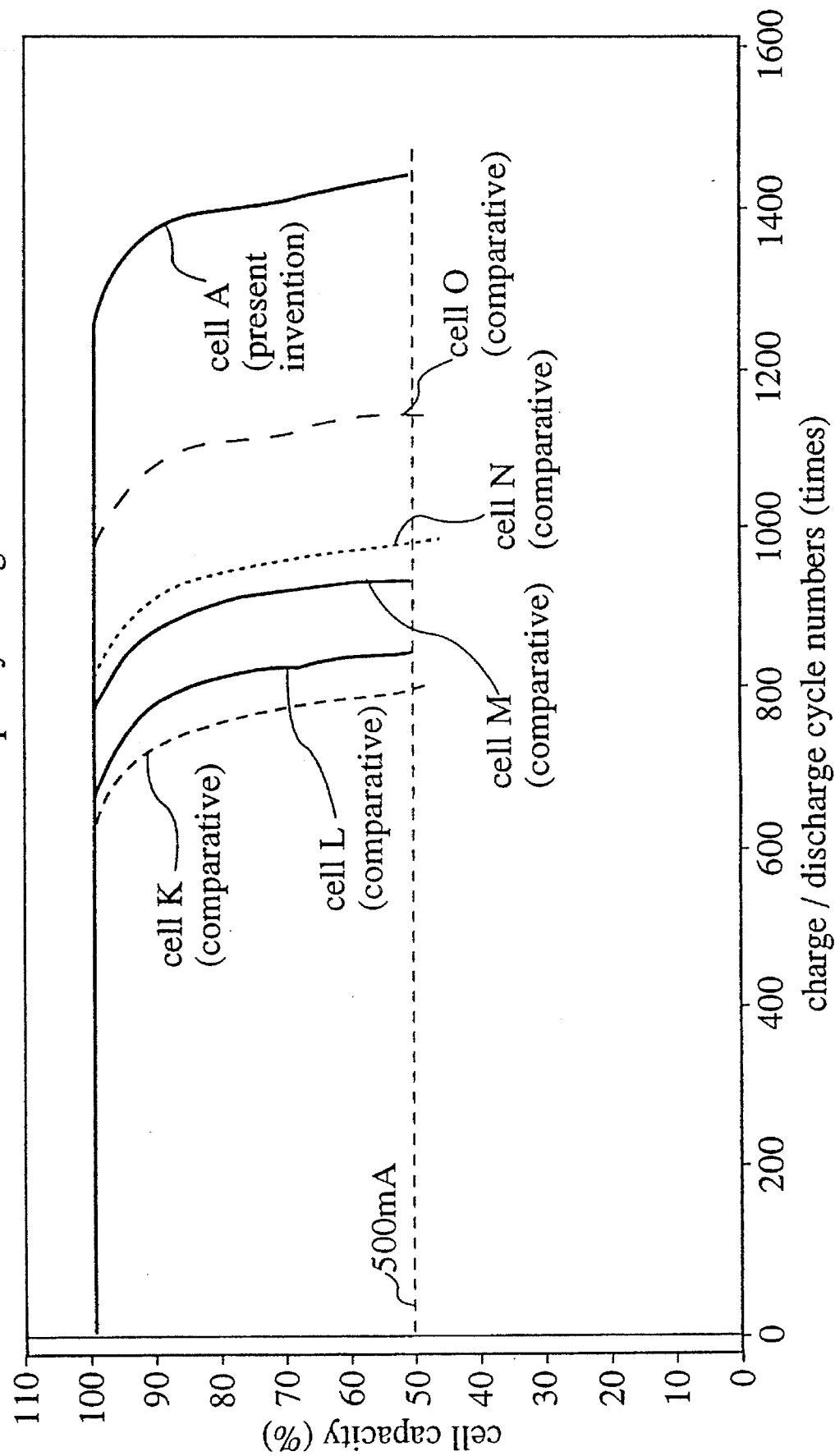
FIG. 4 is a graph showing the relationship between the charge/discharge cycle numbers and the cell capacity (% to the theoretical cell capacity).
Figure 5:
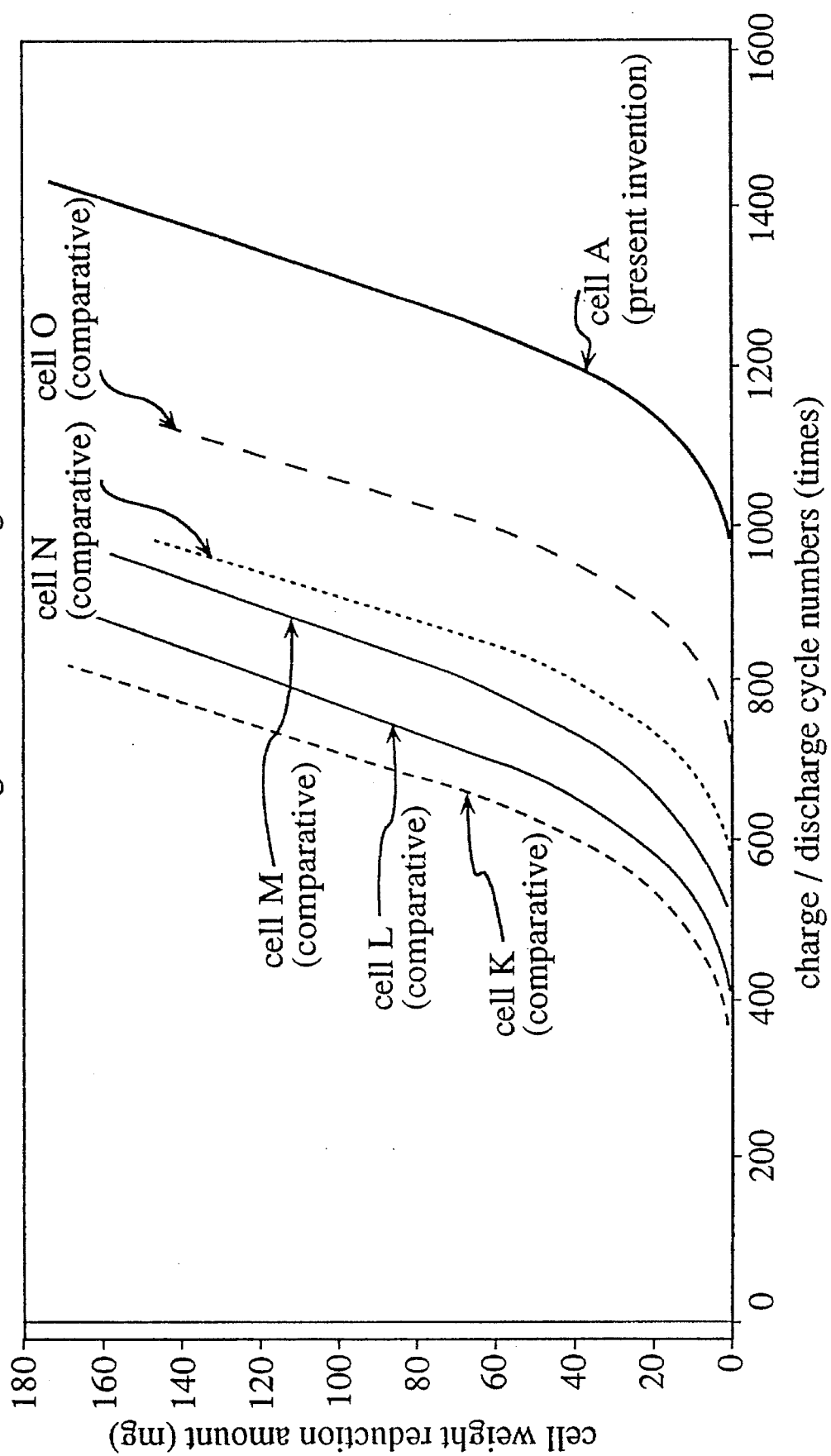
FIG. 5 is a graph showing the relationship between the charge/discharge cycle numbers and the amount (mg) of decrease in the cell weight.

FIG. 4 is a graph showing the relationship between the charge/discharge cycle number and the cell capacity (% to theoretical capacity). FIG. 5 is a graph showing the relationship between the charge/discharge cycle numbers and the amount of reduced cell weight (mg).

As apparent from FIG. 4, the cycle lives of the cells were ordered from the longest: cell A>cell O>cell N>cell M> cell L>cell K. As apparent from FIG. 5, the order of the charge/ discharge cycle times were the same as that in FIG. 4.

The reduction in cell weight is caused from that the contents of the cells such as the electrolyte are emitted outside the cells through a safety vent in accordance with the raise in the cell internal pressure. Consequently, cell A of the present invention consumed oxygen gas more smoothly than cells K through O and had less leakage of the electrolyte. The leakage is due to the raise in the cell internal pressure.

The results of the experiments shown in FIGS. 4 and 5 reveal that the restriction of the raise in the cell internal pressure can improve the cell cycle life especially when both acetylene black and cuprous oxide were applied on the surface of the negative electrode. These results coincide with those of the experiments 1 and 2.

Experiment 4

These cells A, B, C, D, E, F, G, H, and I of the present invention and the cells K, L, N, O, P and Q of the comparative experiments were given a charge/discharge cycle test under the same conditions as Experiment 3, and measured the number of the cycles until the discharge capacity went down to 500 mAh. The number of the cycles is defined as cycle life.

The results are shown in Table 3 together with the results of Experiment 3.

TABLE 3

| cells | cycle life (times) |
|---|---|
| *A | 1450 |
| *B | 1380 |
| *C | 1400 |
| *D | 1425 |
| *E | 1390 |
| *F | 1330 |
| *G | 1415 |
| *H | 1370 |
| *I | 1320 |
| K | 790 |
| L | 830 |
| M | 1265 |
| N | 980 |
| O | 1150 |
| P | 1270 |
| Q | 1275 | cells with * use the negative electrode of the present invention

As apparent from Table 3, the cell K with neither carbon powder nor additive, cell L with acetylene black only, cell N with cuprous oxide only (inside the negative electrode), and cell O with cuprous oxide only (on the surface of the negative electrode) had a cycle life of 1200 or smaller. Cells M, P, and Q with acetylene black as carbon powder, and either copper, silver, or bismuth as an additive had a cycle life of smaller than 1300.

On the other hand, cells A, B, C, D, E, F, G, H, and I of the present invention had a cycle life of 1300 times or more.

The comparisons between cells D and E of the present invention and cell P of the comparative example, between cell F of the present invention and cell Q of the comparative example, and between cells A, B, and C of the present invention and cell M of the comparative example were carried out.

The comparison showed that the charge/discharge cycle life was more improved by using a metal in the form of an oxide or a hydroxide than by using the metal itself as an additive.

Hence, it was proved that the charge/discharge cycle life was remarkably improved when the metal hydride electrode was provided with both conductive powder, and an additive made of metallic compound on its surface.

Experiment 5

In the fifth experiment, the appropriate amount of additive to be added was found by adding 1 wt % of acetylene black, as conductive powder and by changing the amount of cuprous oxide to be added, as an additive, between 0 and 10 wt % to the hydrogen-absorbing alloy.

Cells were produced in the same manner as in the first embodiment except that the amount of cuprous oxide to be added was varied. The cycle lives of these cells were measured after charge/discharge cycle under various conditions like in the fourth experiment.

Figure 6:
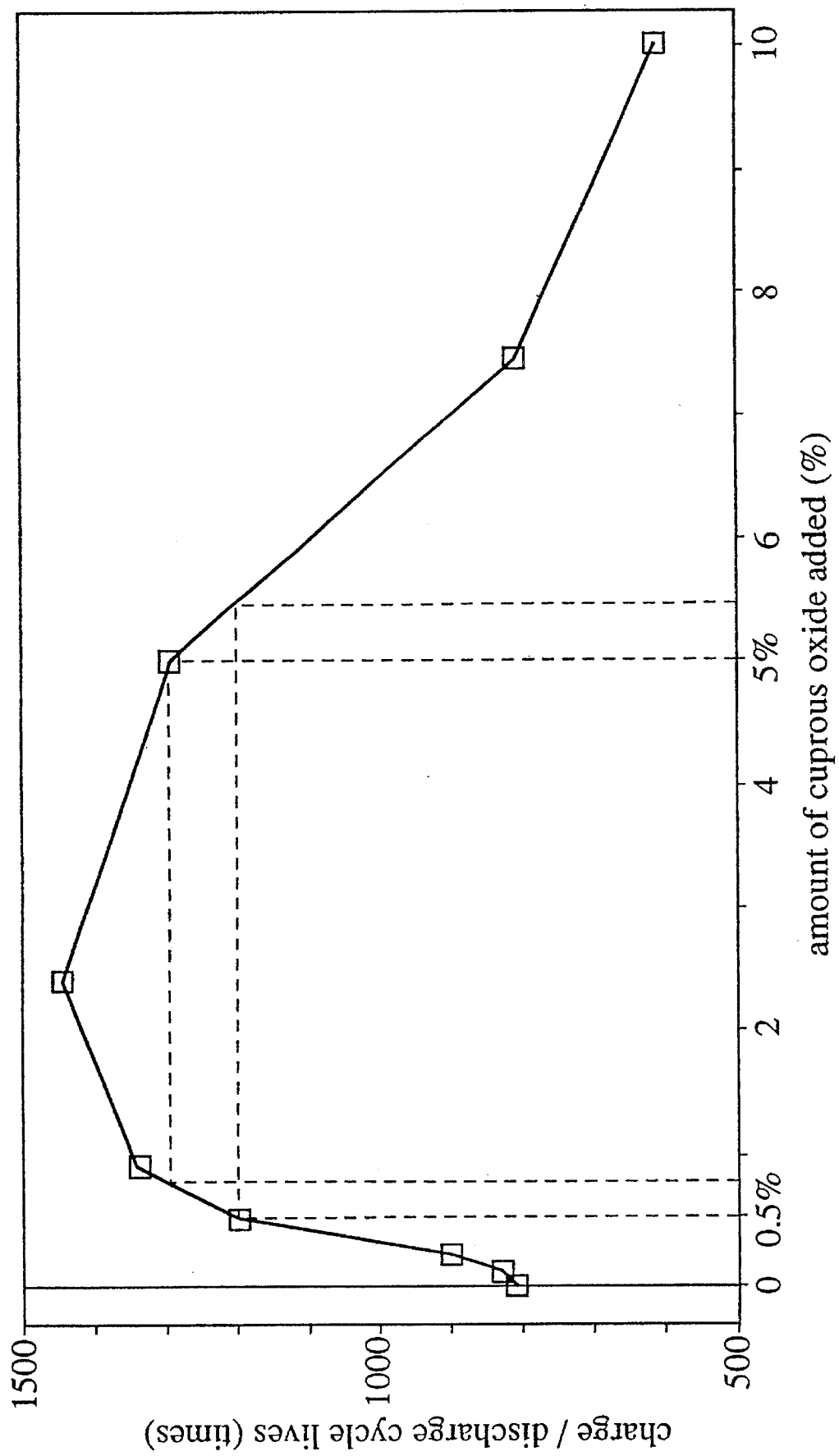
FIG. 6 is a graph showing the relationship between the amount (%) of cuprous oxide to be added to the hydrogen-absorbing alloy and the charge/discharge cycle life.

The results are shown in the graph of FIG. 6. As apparent from the graph, the charge/discharge cycle life was increased or remarkably when the cuprous oxide was in the range of between 0 and 1 wt % and between 5 and decreased remarkably in the range of 10 wt %. The charge/discharge cycle life was kept at 1200 times or more when the range was between 0.5 and 5.4 wt %.

From the results, preferable amount of the additive to the hydrogen-absorbing alloy is between 0.5 and 5.4 wt %, and the most preferable amount is between 0.8 and 5.0 wt %.

Although the present invention has been fully described by way of examples with reference to the accompanying drawings, it is to be noted the various changes and modification will be apparent to those skilled in the art. Therefore, unless such changes and modifications depart from the scope of the present invention, they should be construed as being included therein.

What is claimed is:

1. A metal hydride electrode containing a hydrogen-absorbing alloy comprising:
   a base electrode composed of hydrogen-absorbing alloy powder and a collector; and
   a mixture layer composed of conductive powder and an additive including one of an oxide and a hydroxide of a metal having oxidation-reduction potential nobler than an operating potential of said hydrogen-absorbing alloy, said mixture layer being disposed on a surface of said base electrode.

2. The metal hydride electrode of claim 1, wherein said carbon powder is at least one of acetylene black, carbon black, ketjen black, and active carbon.

3. The metal hydride electrode of claim 1, wherein said additive is at least one of cuprous oxide, cupric oxide, copper hydroxide, silver (I) oxide, silver (II) oxide, and bismuth oxide.

4. The metal hydride electrode of claim 1, wherein said additive is at least one of cuprous oxide, cupric oxide, copper hydroxide, silver (I) oxide, silver (II) oxide, and bismuth oxide.

5. The metal hydride electrode of claim 2, wherein said additive is at least one of cuprous oxide, cupric oxide, copper hydroxide, silver (I) oxide, silver (II) oxide, and bismuth oxide.

6. The metal hydride electrode of claim 5, wherein said additive is in a range of between 0.5 wt % and 5.4 wt % inclusive to said hydrogen-absorbing alloy.

7. An alkaline storage cell provided with a positive electrode, a negative electrode, and an alkaline electrolyte, said negative electrode comprising:
   a base electrode composed of hydrogen-absorbing alloy powder and a collector; and
   a mixture layer composed of carbon powder in an amount sufficient to act as crystal nucleation sites when metallic ions dissolved in the alkaline electrolyte are precipitated and an additive including one of an oxide and a hydroxide of a metal having oxidation-reduction potential nobler than an operating potential of said hydrogen-absorbing alloy, said mixture layer being disposed on a surface of said base electrode.

8. The alkaline storage cell of claim 7 wherein said carbon powder is at least one of acetylene black, carbon black, ketjen black, and active carbon.

9. The alkaline storage cell of claim 7, wherein said additive is at least one of cuprous oxide, cupric oxide, copper hydroxide, silver (I) oxide, silver (II) oxide, and bismuth oxide.

10. The alkaline storage cell of claim 7 wherein said additive is at least one of cuprous oxide, cupric oxide, copper hydroxide, silver (I) oxide, silver (II) oxide, and bismuth oxide.

11. The alkaline storage cell of claim 8, wherein said additive is at least one of cuprous oxide, cupric oxide, copper hydroxide, silver (I) oxide, silver (II) oxide, and bismuth oxide.

12. The alkaline storage cell of claim 11, wherein said additive is in a range of between 0.5 wt % and 5.4 wt % inclusive to said hydrogen-absorbing alloy.

* * * * *

UNITED STATES PATENT AND TRADEMARK OFFICE
CERTIFICATE OF CORRECTION

PATENT NO.:    5,506,074
DATED     :    April 9, 1996
INVENTORS:     Motoo TADOKORO et al It is certified that error appears in the above-identified patent and that said Letters Patent is hereby corrected as shown below:

Column 12, claim 1, line 23, delete "conductive powder" and insert therefor

--carbon powder in an amount sufficient to act as crystal nucleation sites when metallic ions dissolved in alkaline electrolyte are precipatated--.

Signed and Sealed this

Twentieth Day of August, 1996

Attest:

BRUCE LEHMAN

*Attesting Officer*   *Commissioner of Patents and Trademarks*